(12) United States Patent
Calderbank et al.

(10) Patent No.: US 7,623,064 B2
(45) Date of Patent: Nov. 24, 2009

(54) INSTANTANEOUS RADAR POLARIMETRY

(76) Inventors: Arthur Robert Calderbank, 64 Sycamore Rd., Princeton, NJ (US) 08540; Stephen David Howard, 10 Dennis Grove, Vista, South Australia, 5019 (AU); William Moran, 3 Clapham St., Balwyn VIC 3103 (AU)

( * ) Notice: Subject to any disclaimer, the term of this patent is extended or adjusted under 35 U.S.C. 154(b) by 91 days.

(21) Appl. No.: 12/084,452

(22) PCT Filed: Dec. 6, 2005

(86) PCT No.: PCT/US2006/046592

§ 371 (c)(1),
(2), (4) Date: May 2, 2008

(87) PCT Pub. No.: WO2007/120225

PCT Pub. Date: Oct. 25, 2007

(65) Prior Publication Data

US 2009/0262011 A1 Oct. 22, 2009

Related U.S. Application Data

(60) Provisional application No. 60/742,822, filed on Dec. 6, 2005.

(51) Int. Cl.
*G01S 7/292* (2006.01)
*G01S 13/95* (2006.01)

(52) U.S. Cl. .................. 342/188; 342/194; 342/26 R

(58) Field of Classification Search ............. 342/188, 342/194, 26 R, 26 A–26 D
See application file for complete search history.

(56) References Cited

U.S. PATENT DOCUMENTS

| | | | | | |
|---|---|---|---|---|---|
| 4,513,288 | A | * | 4/1985 | Weathers et al. | 342/201 |
| 4,580,139 | A | * | 4/1986 | Weathers et al. | 342/189 |
| H484 | H | * | 6/1988 | Holliday | 342/201 |
| 4,849,762 | A | * | 7/1989 | Barnes | 342/188 |
| 4,928,131 | A | * | 5/1990 | Onozawa | 342/188 |
| 5,264,856 | A | * | 11/1993 | Thurlow | 342/188 |
| 5,313,210 | A | * | 5/1994 | Gail | 342/25 A |
| 5,432,519 | A | * | 7/1995 | Sezai | 342/149 |
| 6,137,433 | A | * | 10/2000 | Zavorotny et al. | 342/26 B |
| 7,355,546 | B2 | * | 4/2008 | Randall | 342/26 R |
| 7,436,351 | B2 | * | 10/2008 | Struckman et al. | 342/148 |
| 2007/0222661 | A1 | * | 9/2007 | Stagliano et al. | 342/26 R |
| 2009/0174596 | A1 | * | 7/2009 | Gekat | 342/26 R |

FOREIGN PATENT DOCUMENTS

| | | | |
|---|---|---|---|
| EP | 42730 | A1 * | 12/1981 |
| EP | 553945 | A1 * | 8/1993 |
| WO | WO 2007120225 | A2 * | 10/2007 |

* cited by examiner

*Primary Examiner*—John B Sotomayor

(57) ABSTRACT

A radar system and method that employs polarization-time diversity in transmitting signals and concurrently processing received reflections from both polarization modes provides information about the scattering matrix of a target without loss of information. Illustratively, the transmitted signals from Golay pairs, and the processing method employs a complex-conjugate time reversal operand. The received reflected signals are processed for a particular distance in mind to develop a scattering matrix of the medium at that distance. By comparing the scattering matrix to known scattering matrices an identification of the target from where the transmitted signals were reflected is obtained.

10 Claims, 1 Drawing Sheet

INSTANTANEOUS RADAR POLARIMETRY

RELATED APPLICATION

This application is related to, and claims priority from, provisional U.S. Patent Application No. 60/742,822, filed, Dec. 6, 2005.

STATEMENT OF GOVERNMENT RIGHTS

This invention was made with government support under Grant No. FA8750-05-2-0285 and No. FA9550-05-1-0443 awarded by the USAF/Air Force Office of Scientific Research. The Government has certain rights in the invention.

BACKGROUND OF THE INVENTION

This relates to multi-channel radar, and more particularly to radar that employ polarization diversity to develop the multiple channels.

There are many proposals for multi-channel radar, emanating from the conventional monostatic radar system where transmitter and receiver are collocated. Collocation makes it easy for transmitter and receiver to share a common stable clock (local oscillator), which is required for both range and Doppler measurements. Signal processing for multi-static radars with widely dispersed antenna elements is currently a very active research area, in part because of significant advances in hardware capabilities, and certainly because multi-static radar enables multiple views of a scene, and a (wide angle) tomographic approach to the recovery of the scene from received data. A substantial improvement in detection results from the availability of multiple views of the target. When system elements are widely dispersed, however, the coherent implementation of multi-static radar is difficult because of clock synchronization problems, though GPS and network technologies have rendered these problems more tractable. An additional challenge of multi-static radars is the degree of computation that is necessary to recover the scene, or detect a target, by integrating multiple views.

It is natural to approach multi-channel radar in terms of spatial diversity concepts developed for multiple-input-multiple-output (MIMO) communications where performance improvement result from the statistical independence of the different channels provided by the spatially separated multiple antenna elements.

Polarimetric radar transmits radio wave pulses that have both horizontal and vertical polarizations. In weather prediction applications, for example, the horizontal pulses essentially give a measure of the horizontal dimension of clouds (cloud water and cloud ice) and precipitation particles (snow, ice pellets, hail, and rain), while the vertical pulses essentially give a measure of the vertical dimension. Since the power returned to the radar is a complicated function of each particles size, shape, and ice density, this additional information results in improved estimates of rain and snow rates, better detection of large hail location in summer storms, and improved identification of rain/snow transition regions in winter storms. The success of polarimetric radar in discriminating diverse regions in radar images demonstrates the value of using all dimensions of the polarization scattering matrix and motivates the use of polarimetry for target detection in a dynamic clutter environment.

Current polarimetric radar systems are capable of serial transmission using two orthogonal polarizations. Typically the radar separates the two orthogonal polarizations by transmitting a waveform on one polarization followed by a second waveform on the orthogonal polarization. The radar receiver accepts signals of both polarizations at all times, but systems that transmit the different polarizations seriatim are not able to form an instantaneous measurement of the fall scattering matrix. It is expected, however, that improved operation (i.e. more robust detections) can be attained by forming such instantaneous measurements and deriving the full scattering matrix.

SUMMARY OF THE INVENTION

An improvement in the art is realized by transmitting on both polarizations, either simultaneously or in rapid succession, and then processing reflections of signals of both polarization types concurrently to separate the effects of the two transmissions. More particularly, a signal $w_1$ is transmitted from a first antenna in a first time frame, and a signal $w_2$ is transmitted from a second antenna in the same first time frame. Reflection signals are received, and then a signal $-\tilde{w}_2$ is transmitted from the first antenna in a second time frame, and a signal $\tilde{w}_1$ is s transmitted from the second antenna in the second time frame, followed by a reception of the reflection signals. The first antenna transmits and receives signals that are nominally polarized in one way (e.g., vertical or circular-left), and the second antenna transmits and receives signals that are nominally polarized in a second way that is orthogonal to the first (e.g. horizontal or circular-right). Advantageously, the signals $w_1$ and $w_2$ are a Golay complementary pair. A signal with a tilde above it represents the complex conjugate time-reversed version of the signal without the tilde; for example, $\tilde{w}_1$ is the complex conjugate time reversed version of $w_1$. The arrival time of the reflected signals is used to obtain a distance measure, and the received reflected signals are processed with that distance in mind to develop a scattering matrix of the medium at the aforementioned distance. By comparing the received scattering matrix obtained for some range to surrounding scattering matrices or some model for the background scattering matrix a detection of an object at that range is obtained.

DETAILED DESCRIPTION

Figure 1:
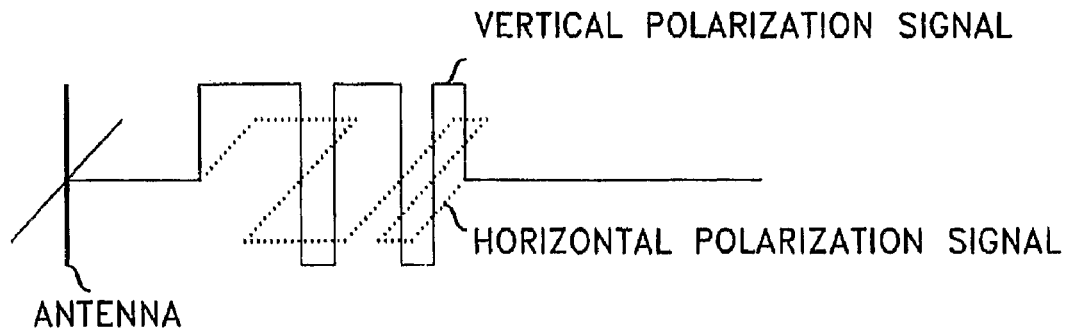
FIG. 1 presents a flowchart of the method disclosed herein.

The primary objective of conventional communication is to convey information from a source location to a remote destination location. The salient features of this situation are: (1) the information of interest originates at the source, (2) the destination is remote from the source, and (3) it is the conveyance of this information to the remote destination that is important. In radar, in contradistinction, the nature of the information contained in the transmitted signal is not significant per se, the conveyance of this information to a destination is not an issue, and the destination is not necessarily remote from the source. Rather, radar concerns itself with the difference between whatever is sent and the reflected signal that is received.

Viewed another way, in conventional communication the received signal is corrupted by modification to the transmitted signal, and the challenge facing the receiver at the destination is to identify the sent signal in spite of reflections and other noise that are introduced by the channel between the source and the destination. Various receivers are known that estimate the corrupting channel—typically during a period when the transmitter sends a known signal—and then employ the estimated corrupting channel to nullify the effects of the corruptions, thereby obtaining superior reception characteristics. In other words in conventional communication the channel is identified so that the transmitted information can be conveyed successfully. In radar, in contradistinction, it is the nature of the channel that is of primary interest.

Surprisingly, we discovered that a known communication approach is beneficial for polarimetric radar.

Space-time codes, introduced by Tarokh, et al. in "space-time codes for high data rate wireless communication: performance criteria in the presence of channel estimation errors, mobility and multiple paths," IEEE Transactions on Communications, col. 47, pp 199-207, February 1999, improve the reliability of communication over fading channels by correlating signals across different (space-separated) transmit antennas. The Alamouti code (U.S. Pat. No. 6,185,258) is described by a 2×2 matrix, where the columns represent two consecutive time slots, the rows represent two different antennas, and the entries are the symbols to be transmitted. There is an intense commercial interest in this code because when this code is used both coherent and non-coherent detection are remarkably simple. Specifically, it is possible to separate the data streams transmitted from the two antennas using only linear processing at the receiver. This means that the end-to-end complexity of signal processing is essentially the same as for single antenna systems.

The encoding and transmitting rule for the Alamouti code is $$(c_1, c_2) \rightarrow \begin{pmatrix} c_1 & -\bar{c}_2 \\ c_2 & \bar{c}_1 \end{pmatrix}. \quad (1)$$

That is, given symbols $c_1$ and $c_2$, two antennas, and two time slots, signals $c_1$ and $c_2$ are transmitted by the first and second antenna, respectively, in the first time slot, and signals $-\bar{c}_2$ and $\bar{c}_1$ are transmitted by the first and second antenna, respectively, in the second time slot. The bar over a symbol, $\bar{(\cdot)}$, represents the complex conjugate operand. That is, signal $\bar{c}_1$ is the complex conjugate of signal $c_1$.

At a distant receiver that has a single antenna, the signals that are received over two consecutive time slots are $r_1$ and $r_2$. This may be expressed by $$(r_1 \;\; r_2) = (g_1 \;\; g_2) \begin{pmatrix} c_1 & -\bar{c}_2 \\ c_2 & \bar{c}_1 \end{pmatrix} + \begin{pmatrix} z_1 \\ z_2 \end{pmatrix} \quad (2)$$

where $g_1$ and $g_2$ are functions that characterize the paths from the first transmitting antenna to the receiving antenna, and from the second transmitting antenna to the receiving antenna, respectively. It can be assumed that the noise samples $z_1$, $z_2$ are independent samples of a zero-mean complex Gaussian random variable with noise energy $N_0$ per complex dimension. Equation (2) can be expressed in matrix notation as:

$$r = gc + z \quad (3)$$

and it may be noted that matrix $$c = \begin{pmatrix} c_1 & -\bar{c}_2 \\ c_2 & \bar{c}_1 \end{pmatrix}$$

is orthogonal.

As indicated above, channel estimation in communications is the analogue of radar image formation. In U.S. Pat. No. 6,959,047 a channel estimation process is disclosed where the channel is viewed as a finite impulse response (FIR) filter, and the channel estimation becomes the task of identifying the coefficients of the FIR filter. To that end, a training sequence is used that is long enough to provide sufficient information in order to compute the FIR filter coefficients. When a pair of symbols in the training sequence is known, such as signals $c_1$ and $c_2$, and the received signal (processed in two time slot bites) is multiplied by $\bar{c}$. The result is $$r\bar{c} = (|c_1|^2 + |c_2|^2)g + z_0 \quad (4)$$

where $z_0$ is still white and, therefore, $g_1$ and $g_2$ are easily estimated. Each pair of symbols in the training sequence contributes one coefficient of the FIR filter that represents the channel.

In the discussion that follows, a radar system is disclosed that employs an antenna arrangement that is adapted to transmit and receive signals that are nominally polarized in one way, and to independently also transmit and receive signals that are nominally polarized along a second way that is orthogonal to the first. For convenience, the discussion that follows employs the terms "vertical" and "horizontal" for these two polarizations, but that should not be interpreted as a limitation. Also, the caveat "nominally" is not used infra, but it should be understood to be included wherever appropriate.

The radar cross-section of an extended target such as an aircraft or a ship is highly sensitive to the angle of incidence and angle of view of the sensor. In general, the reflection properties that apply to each polarization component are also different, and indeed reflection can change the direction of polarization. Obviously, any and all information that is obtained from a target should be used to the extent possible, and that extends to the different polarization signals that a target reflects, both in response to vertical as well as horizontal polarization signals that hit the target and reflected therefrom. In other words, it is beneficial to be able to compute the scattering matrix of a target $$\Sigma = \begin{pmatrix} \sigma_{VV} & \sigma_{VH} \\ \sigma_{HV} & \sigma_{HH} \end{pmatrix} \quad (5)$$

where each of the terms denotes the denotes the target scattering coefficient relevant to the subscripts. Thus, for example, $\sigma_{VH}$ denotes the target scattering coefficient of vertically polarized signal that returns from the target that is hit by a horizontally polarized signal. Note that the scattering matrix is computed at each delay, at least to within an accuracy that is determined by the chip length, and if the target is extended in range this scattering matrix is range dependent.

Actually, what is received by the radar antennas is the combination of three matrices $$H = \begin{pmatrix} h_{VV} & h_{VH} \\ h_{HV} & h_{HH} \end{pmatrix} \quad (6)$$

$$= C_{Rx} \Sigma C_{Tx},$$

where $C_{Rx}$ and $C_{Tx}$ correspond to the polarization coupling properties of the transmit and receive antennas themselves, while Σ results from the target. The cross-coupling terms in the antenna polarization matrices are clearly frequency and antenna geometry dependent but for the linearly polarized case this value is typically no better than about −20 dB. Ideally, the $C_{Rx}$ and $C_{Tx}$ matrices are $$\begin{bmatrix} 1 & 0 \\ 0 & 1 \end{bmatrix},$$

but this does not hold in real systems. When the transmit and receive antennas are common, as is the case in most radar systems, the matrices $C_{Rx}$ and $C_{Tx}$ are conjugates of each other.

In accord with the principles disclosed herein, an improved radar system is realized by having the radar transmit sequences $w_V$ and $w_H$ in a first transmission time frame over the vertical and horizontal antennas, respectively, and sequences $-\tilde{w}_H$ and $\tilde{w}_V$ in a next transmission time frame over the vertical and horizontal antennas, respectively, and processing the consequences of the two transmissions together. The operand (•) is not necessarily the complex conjugate.

The processing is easiest described in the z-transform domain, so that for example the waveform $w_V=[w_V(0)\ w_V(1) \ldots w_V(L-1)]$ is represented by its z-transform $w_V=w_V(0)+w_V(1)z+w_V(2)z^2+\ldots+w_V(L-1)z^{L-1}$ and the VV component of the scattering matrix at different delays, $h_{VV}=[h_{VV}(0)\ h_{VV}(1) \ldots h_{VV}(R-1)]$, by $h_V=h_{VV}(0)+h_{VV}(1)z+h_{VV}(2)z^2+\ldots+h_{VV}(R-1)z^{R-1}$. The received signals in consequence of the two transmissions, appearing at two consecutive receive time frames, can be described by $$R = \begin{bmatrix} h_{VV} & h_{VH} \\ h_{HV} & h_{HH} \end{bmatrix} \begin{bmatrix} w_V & -\tilde{w}_H \\ w_H & \tilde{w}_V \end{bmatrix} + Z \quad (6)$$

or $$R = HW + Z, \quad (7)$$

where multiplication and addition in the entries of the matrices is in the algebra of polynomials. R is a (received signals in two polarization modes, in two consecutive time slots), H, and W are 2×2 matrices of polynomials in z.

If the operand (•) is selected sequences so that $\tilde{w}V=w_V$, and $w_V$ and $w_H$ are selected so that $$W\tilde{W} = \begin{bmatrix} (w_V\tilde{w}_V + w_H\tilde{w}_H) & (w_V\tilde{w}_H - w_V\tilde{w}_H) \\ (w_H\tilde{w}_V - w_H\tilde{w}_V) & (w_V\tilde{w}_V + w_H\tilde{w}_H) \end{bmatrix} = Kz^{L-1}I_2 \quad (8)$$

where $I_2$ is a 2×2 identity matrix, then $$R\tilde{W} = HW\tilde{W} + Z\tilde{W} \quad (9)$$

$$R\tilde{W} = Kz^{L-1}HI + Z\tilde{W}$$

or $$\frac{1}{Kz^{L-1}}R\tilde{W} + Z' = H.$$

Equation (8) effectively states that the sequences $w_V$ and $w_H$ must be such that $$(w_V\tilde{w}_H - \tilde{w}_H w_V) = (w_H\tilde{w}_V - \tilde{w}_V w_H) = 0 \text{ and}$$

$$(w_V\tilde{w}_V + \tilde{w}_H w_H) = (w_H\tilde{w}_H + \tilde{w}_V w_V) = Kz^{L-1}I_L. \quad (10)$$

The coefficient of $z^j$ in the polynomial $(w_V\tilde{w}_V + \tilde{w}_H w_H)$ is $$\sum_{i=max(0,j-(L-1))}^{min(j,L-1)} [w_V(j-i)\overline{w}_V(i) + \overline{w}_H(i)w_H(j-i)] \quad (11)$$

for $j=0, 1, 2, \ldots, 2L-1$, and equation (10) holds when equation (11) evaluates to 0 if $j \neq L-1$ and equals K if $j=L-1$.

It can be shown that complex Golay complementary pairs (see M. J. E. Golay, "Complementary Series," IRE Transactions on Information Theory, vol. 7, pp. 82-87, April, 1961) satisfy the requirement of equation (11) with K=2L. Formally, two length-N unimodular sequences of complex numbers x and y are Golay complementary if the sum of their autocorrelation functions satisfies $$Corr_k(x) + Corr_k(y) = 2ND^N \text{ for } k=-(N-1), \ldots (N-1). \quad (12)$$

Regarding the specifics of sequences $w_V$ and $w_H$, in an illustrative embodiment in accord with the above we propose to use a QPSK scheme. That is, we propose to transmit a waveform at each polarization that consists of a sequence of coefficients that are fourth roots of unity. In simple terms, we propose to send a carrier signal that at the time of each symbol in the sequence is modulated by 1 or −1, or a 90°-shifted replica of the carrier signal is modulated by 1 or −1. In a simple case, where the sequence uses only real coefficients (1, and −1), an illustrated Golay pair is $w_V=(1,1,1,-1,1,1,-1,1)$, and $w_H=(1,1,1,-1,-1,-1,1,-1)$.

One characteristic of Golay pairs is that they produce no side lobes in delay. This is an extremely beneficial characteristic for radar applications where targets that produce small reflections may be effectively hidden in the side lobes of large nearby reflections.

Figure 2:
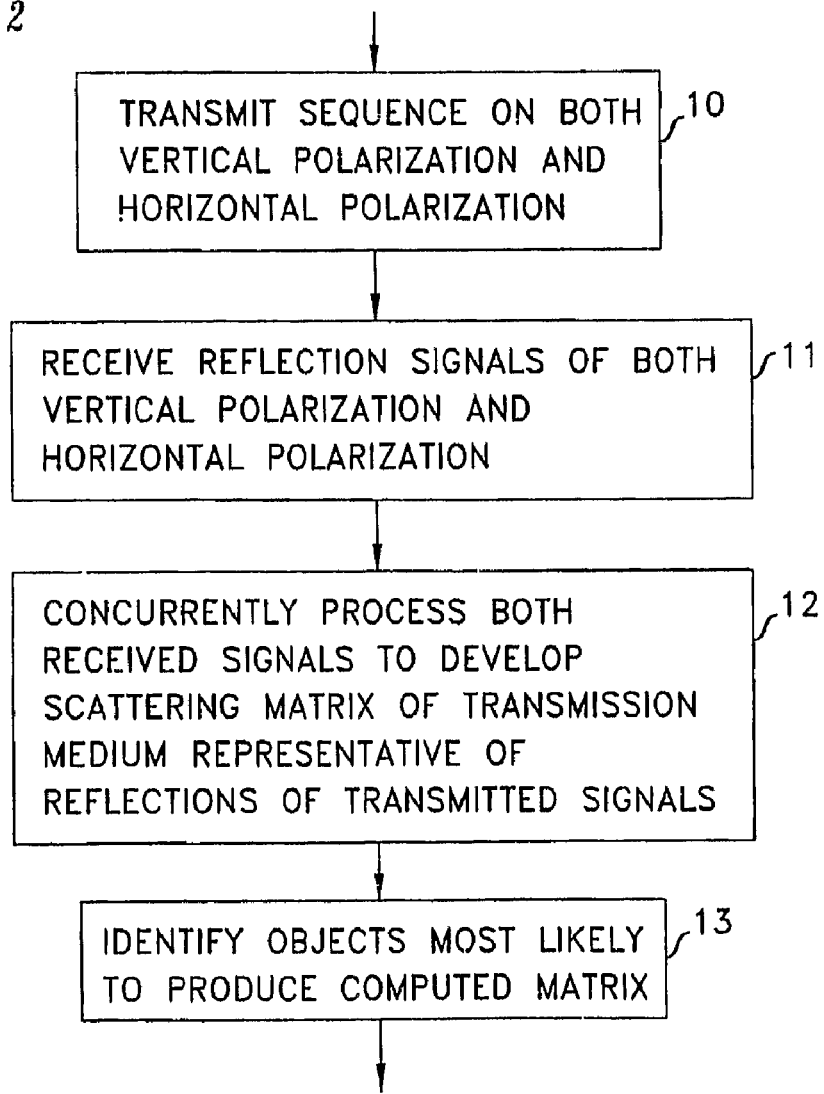
FIG. 2 provides a visual representation of an antenna used in an apparatus employing the method of FIG. 1 and the signals transmitted by the antenna.

The principles disclosed herein are illustrated in FIGS. 1 and 2, where FIG. 1 shows an antenna arrangement that is transmits and receives signals in vertical polarization mode and independently transmits and receives signals in horizontal polarization mode. In step 10 the sequences $w_V$, $w_H$, $-\tilde{w}_H$, and $\tilde{w}_V$ are transmitted as disclosed herein, in step 11 the reflections of the transmitted signals are received, and in step 12 the reflection signals are processed as disclosed herein to result in the scattering matrix, H, which corresponds to the particular objects (and their distance from the FIG. 1 antennas) that caused the reflections of the transmitted signals.

Once the H matrix is computed, it is used. Two pieces of information that are easily put to use are the strength of the reflections, which is obtained from the values of the H matrix and the delay of the reflection. These elements say something about the reflectivity of the target, and the range of the target. Additionally, the H matrix may be used to identify the presence of a target by comparing the H matrix from one general direction and range to the H matrix at a slightly different direction, range, or time, or by comparing the H matrix to a model of the expected H matrix. Thus, for example, the H matrix from a field of grass with men hiding in the grass in one area is different from the H matrix from a slightly different area of the field, or taken at a different time. Once the H matrix is computed as disclosed above, it is compared to the H matrices at surrounding delays or those derived from some statistical model of the background, to detect the presence of an object at that delay (range). Additionally still, H matrix may be used to actually identify the target because a tank, for example, produces a different set of reflections than a house. In such an application, the FIGS. 1 and 2 radar system includes a database that contains the different H matrices that different targets typically produce. Once the H matrix is computed as disclosed above, it is compared to H matrices in the database and when a close match is found a statement as to the identity of the found object and a measure of confidence in the statement can be made.

Some Concluding Remarks:

Radar signal processing is complicated by side lobes arising from the convolution of the scene with the auto-correlation of the illuminating waveforms. Extensive work has been done on waveform design for the manipulation of waveform sidelobes, and it is noted that previous work on single channel radar employs consecutive transmission of Golay complementary waveforms to eliminate range side lobes and produce a "thumbtack" auto-correlation. It might also be noted that cross-correlation between waveforms separated by one or more PRIs (consecutive transmission) produces range-aliasing.

The four channel signal processing as described above combines instantaneous access to the full polarization scattering matrix with the elimination of range sidelobes. In addition, range-aliasing sidelobes are smaller than in single channel radars using sequences of identical pulses, because the four waveforms comprising the matrix W are mutually orthogonal.

Matched filtering at the front end of radar signal processing that is carried out solely in one dimension (for example, single polarization) always incurs a loss of information, since the received signal cannot be recovered from the matched filter output. However, the four-channel signal processing disclosed above incurs no loss of information since the matched filter bank is orthogonal.

An alternative approach to single channel radar signal processing is to solve an inverse problem in order to avoid the loss incurred by matched filtering. This method is notoriously sensitive to receiver noise. In four-channel signal processing, as disclosed above, inversion and matched filtering coincide, since the filter bank is orthogonal, and instabilities do not occur.

It would appear from the above that the correlation sidelobes vanish only at delays that are multiples of the chip length, but in fact it is a property of Golay pairs that it actually holds for all possible non-zero delays.

Signal processing complexity is essentially the same as for the base-line radar system; all that changes is the initial matched filter.

Diversity requires waveforms transmitted from different antennas to be reflected in different ways from the target. This is true for differently polarized waveforms and for waveforms that are transmitted from sufficiently spatially separated antennas. The advantage of polarization diversity is that time-synchronization of the vertical and horizontal returns from a target is automatic, so that we avoid the complication of time-of-arrival signal considerations.

The invention claimed is:

1. A method for developing information about objects that reflect electromagnetic signals that reach the objects, comprising the steps of:

transmitting a first signal in a first polarization mode and a second signal in a second polarization mode, where the first polarization mode is orthogonal to the second polarization mode;

transmitting a third signal in the first polarization mode and a second signal in the said second polarization mode;

receiving a fifth signal having said first polarization mode that results from said first signal and from said second signal, a sixth signal having said second polarization mode that results from said first signal and from said second signal;

receiving a seventh signal having said first polarization mode that results from said third signal and from said fourth signal, an eighth signal having said second polarization mode that results from said third signal and from said fourth signal;

processing said fifth signal, said sixth signal, said seventh signal and said eighth signal together to create said information about objects; and employing the created information to characterize object that produced said fifth, sixth, seventh and eighth signals.

2. The method of claim 1 where said first signal and said second signal are transmitted concurrently and where said third signal and said fourth signal are transmitted concurrently.

3. The method of claim 1 where said first signal is a first digital sequence of bits having a selected chip rate, and the second signal is a second digital sequence of bits having a selected chip rate.

4. The method of claim 3 where the third digital sequence is the negative complex-conjugate time reversed replica of the second digital sequence and the fourth signal is a complex conjugate time reversed replica of the first signal.

5. The method of claim 4 where the first digital sequence and the second digital sequence form a Golay pair.

6. The method of claim 4 where the first and second signals are transmitted concurrently and the third and fourth signals are transmitted concurrently, while the first and second signals pair and third and fourth signals pair transmitted alternately.

7. The method of claim 3 where the first signal and the second signal are transmitted alternately at a data rate that is higher than the chip rate.

8. The method of claim 1 where the processing develops a scattering matrix $$H = \begin{pmatrix} h_{VV} & h_{VH} \\ h_{HV} & h_{HH} \end{pmatrix}$$

where $h_{VV}$ is represents a signal having the first polarization received in response to a transmitted impulse having the first polarization, $h_{VV}$ is represents a signal having the first polarization received in response to a transmitted impulse having the first polarization, $h_{VH}$ is represents a signal having the first polarization received in response to a transmitted impulse having the second polarization, and $h_{HV}$ is represents a signal having the second polarization received in response to a transmitted impulse having the first polarization, and $h_{HH}$ is represents a signal having the second polarization received in response to a transmitted impulse having the second polarization.

9. The method of claim 8 the step of employing forms a decision based on magnitude of coefficients of said $h_{VV}$, $h_{VV}$, $h_{VH}$, $h_{HV}$, and $h_{HH}$ signals.

10. The method of claim 8 where the step of employing forms a decision based on comparison of said matrix H to a benchmark matrix.

* * * * *